United States Patent
Schwengler et al.

(10) Patent No.: US 11,486,267 B2
(45) Date of Patent: Nov. 1, 2022

(54) ROLLING ELEMENT DEVICE WITH JOINTLY TILTABLE RACEWAYS

(71) Applicant: Rolls-Royce Deutschland Ltd & Co KG, Blankenfelde-Mahlow (DE)

(72) Inventors: Jonas Schwengler, Berlin (DE); Tobias Eberhardt, Heidesee (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 182 days.

(21) Appl. No.: 16/830,164

(22) Filed: Mar. 25, 2020

(65) Prior Publication Data
US 2020/0362727 A1 Nov. 19, 2020

(30) Foreign Application Priority Data
Apr. 12, 2019 (DE) .................... 10 2019 205 345.9

(51) Int. Cl.
| | |
|---|---|
| *F01D 25/16* | (2006.01) |
| *F16C 27/04* | (2006.01) |
| *F02C 7/06* | (2006.01) |
| *F02C 7/36* | (2006.01) |

(52) U.S. Cl.
CPC .......... *F01D 25/16* (2013.01); *F01D 25/164* (2013.01); *F02C 7/06* (2013.01); *F02C 7/36* (2013.01); *F16C 27/04* (2013.01); *F05D 2240/50* (2013.01); *F05D 2260/40311* (2013.01); *F16C 2360/23* (2013.01)

(58) Field of Classification Search
CPC ....... F05D 2260/40311; F05D 2240/50; F05D 2250/314; F01D 25/16; F01D 25/164; F16C 33/581; F16C 27/04; F16C 2360/23; F16C 23/08; F02C 7/06; F02C 7/36
See application file for complete search history.

(56) References Cited

U.S. PATENT DOCUMENTS

| | | | | |
|---|---|---|---|---|
| 2,826,462 A | * | 3/1958 | Evans ..................... | F16C 23/06 |
| | | | | 384/519 |
| 9,194,429 B2 | * | 11/2015 | Ashmore ............ | F16C 33/7823 |
| 10,533,451 B2 | * | 1/2020 | Klaus .................. | F16H 57/0006 |
| 2003/0210979 A1 | * | 11/2003 | Doerflein .............. | F16C 23/084 |
| | | | | 415/1 |
| 2005/0254945 A1 | | 11/2005 | VanDuyn | |
| 2015/0285154 A1 | * | 10/2015 | Sheridan .................. | F02C 3/04 |
| | | | | 475/159 |

(Continued)

OTHER PUBLICATIONS

German Search Report dated Dec. 2, 2019 from counterpart German App No. 10 2019 205 345.9.

*Primary Examiner* — Woody A Lee, Jr.
*Assistant Examiner* — Jesse M Prager
(74) *Attorney, Agent, or Firm* — Shuttleworth & Ingersoll, PLC; Timothy Klima

(57) ABSTRACT

A roller element device, in particular for a gas turbine engine, comprises an outer ring with an inner raceway, an inner ring with an outer raceway, and roller elements which are arranged between the raceways so as to roll thereon, wherein the outer ring and the inner ring are each connected via a connecting portion to a respective fixing portion for fixing to one of two components which are rotatable relative to each other about a rotation axis, and the connecting portions are formed such that the two raceways can be jointly tilted at least in portions relative to the rotation axis.

13 Claims, 8 Drawing Sheets

(56) References Cited

U.S. PATENT DOCUMENTS

| | | | |
|---|---|---|---|
| 2016/0025003 A1* | 1/2016 | Schwarz | F04D 29/321 |
| | | | 415/69 |
| 2017/0009603 A1 | 1/2017 | Carter et al. | |
| 2017/0108084 A1* | 4/2017 | Chmylkowski | F16H 1/2818 |

* cited by examiner

ROLLING ELEMENT DEVICE WITH JOINTLY TILTABLE RACEWAYS

RELATED APPLICATIONS

This application claims priority to German Patent Application DE102019205345.9 filed Apr. 12, 2019, the entirety of which is incorporated by reference herein.

BACKGROUND OF THE INVENTION

The present disclosure relates to a roller element device, a gear mechanism and a gas turbine engine, and to a method for producing a roller element device according to the present disclosure.

In roller bearings and gear mechanisms, for the components (e.g. a shaft and a bearing shell) which are movable about an axis relative to each other, the aim is usually to keep a tilting relative to this axis as small as possible in order to guarantee a secure support of the movable components. For example, in a roller bearing with cylindrical rollers as roller elements, beyond a specific tilt angle, edge wear occurs, whereby the roller elements can be heavily worn.

For this, supporting structures of the bearing and gear mechanism are usually designed with reinforcement corresponding to the forces occurring in the respective application, but this can lead to a comparatively high weight.

Alternatively, it is possible to use e.g. tilt-tolerant roller bearings, for example spherical roller bearings or toroidal roller bearings. Such bearings however often have disadvantages, e.g. in relation to the cost of assembly, power losses and/or radial load-bearing capacity.

To transmit high torques, use is often made of gear mechanism assemblies which comprise a planetary gear mechanism mounted on a load-bearing structure by means of a holding device. Planetary gear mechanisms can be employed as reduction gears in order, for example, to use a high-speed shaft of a gas turbine engine to drive a fan at a lower speed. This allows a particularly large diameter of the fan despite a high speed of a turbine driving the shaft.

In order to withstand loads during operation over the long term, planetary gear mechanisms of gas turbine engines and the corresponding bearings are usually of correspondingly massive construction. However, a high weight can lead to increased fuel consumption if the gas turbine engine is used in an aircraft, for example.

SUMMARY AND DESCRIPTION OF THE INVENTION

It is the object of the present invention to provide an improved roller element device.

According to one aspect, a roller element device is provided which may in particular be configured for use in a gas turbine engine. The roller element device comprises an outer ring with an inner raceway, an inner ring with an outer raceway, and roller elements. The roller elements are arranged between the raceways so that they can roll on the inner and outer raceways. The outer ring is connected, via a connecting portion assigned to the outer ring, to a fixing portion assigned to the outer ring, for fixed connection to one of two components which are rotatable relative to each other about a rotation axis. The inner ring is connected, via a connecting portion assigned to the inner ring, to a fixing portion assigned to the inner ring, for fixed connection to the other of the two components which are rotatable relative to each other about a rotation axis. The connecting portions are configured such that the two raceways can be tilted jointly at least in portions (optionally each as a whole) relative to the rotation axis.

A roller element device configured in this way allows tilting of the raceways without seizing of the roller elements and edge wear, even if cylindrical rollers are used as roller elements, because the raceways tilt jointly. In this way, the roller element device can be produced with comparatively little material usage, whereby a low weight of the roller element device can be achieved. Thus a particularly lightweight and simultaneously durable roller element device can be provided which can also offers improved robustness and reliability. Furthermore, a radial bearing stiffness may be set. The roller element device is for example a cylindrical roller bearing.

The two raceways and/or connecting portions are matched to each other so that they are jointly tiltable. For example, the raceways have the same or different (axial) lengths, and/or the connecting portions have the same or different material thicknesses. Optionally, reinforcements are formed or attached on one or both connecting portions and/or on one or both raceways. Alternatively or additionally, one or more openings are provided, e.g. on one or both connecting portions. Optionally, the outer ring, the connecting portion assigned to the outer ring and/or the fixing portion assigned to the outer ring may be formed integrally, optionally of one piece with each other, alternatively of several pieces, and/or attached to each other. Correspondingly, the inner ring, the connecting portion assigned to the inner ring and/or the fixing portion assigned to the inner ring may be formed integrally, optionally of one piece with each other, alternatively of several pieces, and/or attached to each other.

The two components which are rotatable relative to each other about the rotation axis may be a stationary supporting structure and a component of the gas turbine engine which is rotatable relative to said structure by means of a turbine. For example, the roller element device is configured for rotatable mounting of the rotatable component on the stationary supporting structure.

The connecting portions are for example configured to be flexible. This allows tilting without complex mechanisms.

Optionally, the connecting portions are deformed (in particular elastically) under the external effect of a force such that the two raceways are tilted at least in portions by substantially the same angle relative to the rotation axis. For example, a relative tilt between the two raceways is less than 1.5 mrad.

The raceways are e.g. oriented parallel to each other (in particular viewed in cross-section along the rotation axis) both in a state tilted relative to the rotation axis and also in a state not tilted relative to the rotation axis.

The connecting portions each have a stiffness. The stiffnesses may be matched to each other, e.g. such that a relative tilt between two raceways is less than 1.5 mrad, while a common tilt relative to the rotation axis lies significantly above this value (for example by a multiple of this value, e.g. at least one order of magnitude higher).

Optionally, the stiffnesses have a ratio relative to each other of 1.0+/−0.2, in particular 1.0+/−0.1, in particular 1.0+/−0.05.

Optionally, one or both raceways is/are arranged overhanging (relative to the respective fixing portions). The roller element device forms e.g. an overhanging roller bearing. This allows simple construction which can also be achieved with small installation space.

The outer ring and/or the inner ring may be arranged axially spaced from the respective fixing portion by the respective connecting portion. This allows a compact construction and in this way an overhanging arrangement of the raceways can be achieved.

The roller element device may be a roller bearing. The raceways are then for example flat. For example, the roller bearing is a cylinder roller bearing of type N, NU or NJ.

In a refinement, the roller element device is configured as a cylindrical roller bearing. The roller elements have e.g. a cylindrical form, e.g. in the form of rolls. The axial length of the roller elements may be greater than the diameter.

According to one aspect, a gear mechanism is provided. The gear mechanism is configured for example for driving a fan of the gas turbine engine. The gear mechanism comprises a roller element device (optionally several roller element devices) according to any embodiment described herein.

The gear mechanism is for example configured as a planetary gear mechanism with a gear element mounted rotatably by means of the roller element device. The gear element may for example be a planet carrier or a ring gear.

Alternatively, with the gear mechanism configured as a planetary gear mechanism, e.g. the outer ring of the roller element device forms a ring gear, the inner ring of the roller element device forms a sun wheel, and the roller elements form the planet wheels of the planetary gear mechanism.

The planetary gear mechanism may have helical gearing, in particular double helical gearing, e.g. herringbone gearing. Alternatively, however, spur gearing is also conceivable.

According to one aspect, a gas turbine engine is provided for an aircraft which comprises a roller element device and/or the gear mechanism according to any embodiment described herein. The engine is a gas turbine engine, for example, or an electrically driven engine (e.g. an E fan).

According to one aspect, a gas turbine engine is provided for an aircraft and comprises the following: a core engine which comprises a turbine, a compressor and a core shaft connecting the turbine to the compressor; a fan, which is positioned upstream of the core engine, wherein the fan comprises a plurality of fan blades; and a gear mechanism which can be driven by the core shaft, wherein the fan can be driven at a lower speed than the core shaft by means of the gear mechanism, wherein the gear mechanism is configured according to any embodiment described herein.

In the gas turbine engine, the turbine may optionally be a first turbine, the compressor a first compressor, and the core shaft a first core shaft. The core engine may further comprise a second turbine, a second compressor, and a second core shaft connecting the second turbine to the second compressor. The second turbine, second compressor, and second core shaft may be arranged so as to rotate at a higher rotational speed than the first core shaft.

According to one aspect, a method for producing a roller element device is provided, in particular a roller element device according to any embodiment described herein. The method comprises a step of providing an outer ring with an inner raceway and an inner ring with an outer raceway, wherein the outer ring and the inner ring are each connected via a connecting portion to a respective fixing portion for fixed connection to one of two components which are rotatable relative to each other about a rotation axis, and the connecting portions are matched to each other such that the two raceways can be jointly tilted at least in portions relative to the rotation axis. The method furthermore comprises a step of arranging roller elements between the raceways such that the roller elements can roll thereon.

The matched configuration of the connecting portions may additionally be based on a predefined radial bearing stiffness which can thus be set in a particularly simple fashion.

Optionally, the method furthermore comprises a step of determining a geometry and/or a material property of the connecting portions in an optimization procedure. As an option, the optimization procedure comprises an FEM algorithm and/or is performed iteratively.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear mechanism. Accordingly, the gas turbine engine may comprise a gear mechanism which is driven via the core shaft and the output of which drives the fan in such a way that it has a lower rotational speed than the core shaft. The input to the gear mechanism may be provided directly from the core shaft, or indirectly via the core shaft, for example via a spur shaft and/or spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may furthermore comprise a second turbine, a second compressor, and a second core shaft connecting the second turbine to the second compressor. The second turbine, second compressor and second core shaft may be arranged so as to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gear mechanism may be designed to be driven by the core shaft that is configured to rotate (for example during use) at the lowest rotational speed (for example the first core shaft in the example above). For example, the gear mechanism may be designed to be driven only by the core shaft that is configured to rotate (for example during use) at the lowest rotational speed (for example only by the first core shaft and not the second core shaft, in the example above). Alternatively, the gear mechanism may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, when a second compressor is provided. By way of further example, the flow at the exit of the compressor may be supplied to the inlet of the second turbine, if a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of attack may be variable). The row of rotor blades and the row of stator blades may be axially offset with respect to one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to one another.

Each fan blade may have a radial span extending from a root (or a hub) at a radially inner location over which gas flows, or from a position of 0% span, to a tip with a 100% span. The ratio of the radius of the fan blade at the hub to the radius of the fan blade at the tip may be less than (or of the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade over which gas flows, i.e. the portion radially outside any platform.

The radius of the fan may be measured between the engine centerline and the tip of the fan blade at its leading edge. The diameter of the fan (which can generally be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely as a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of a further non-limiting example, the rotational speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by an engine nacelle and/or a fan case.

The overall pressure ratio of a gas turbine engine as described and/or claimed herein may be defined as the ratio of the ram pressure upstream of the fan to the ram pressure at the exit of the highest pressure compressor (before entry into the combustor). By way of a non-limiting example, the overall pressure ratio of a gas turbine engine as described and/or claimed herein at constant speed can be greater than (or in the magnitude of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

In use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or of the order of): 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in the use of the engine may be at least (or of the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or aerofoil portion of a fan blade described and/or claimed herein may be produced from any suitable material or combination of materials. For example at least a part of the fan blade and/or aerofoil may be produced at least in part from a composite, for example a metal matrix composite and/or an organic matrix composite, such as carbon fiber. As a further example, at least a part of the fan blade and/or aerofoil may be produced at least in part from a metal, such as e.g. a titanium-based metal or an aluminium-based material (such as e.g. an aluminium-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely by way of example, the fan blade may have a carbon-fiber or aluminium-based body (such as an aluminium-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage with a corresponding slot in the hub (or disc). Purely as an example, such a fixture may be in the form of a dovetail that may slot into and/or be brought into engagement with a corresponding slot in the hub/disc in order to fix the fan blade to the hub/disc. As a further example, the fan blades may be formed integrally with a central portion. Such an arrangement may be referred to as a blisk or a bling. Any suitable method may be used to manufacture such a blisk or such a bling. For example, at least a part of the fan blades may be machined from a block and/or at least part of the fan blades may be attached to the hub/disc by welding, such as e.g. linear friction welding.

The gas turbine engines described and/or claimed herein may or may not be provided with a variable area nozzle (VAN). Such a variable area nozzle may allow the exit area of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85 or in the range of from 0.8 to 0.85. Any speed within these ranges may be the cruise condition. In the case of some aircraft, the cruise condition can be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of magnitude of 11000 m. The cruise conditions may correspond to standard atmospheric conditions at any given altitude in these ranges.

Purely as an example, the cruise conditions may correspond to the following: a forward Mach number of 0.8, a pressure of 23000 Pa and a temperature of −55° C.

As used anywhere herein, "cruising speed" or "cruise conditions" may mean the aerodynamic design point. Such an aerodynamic design point (or ADP) may correspond to the conditions (comprising, for example, the Mach number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described above in relation to one of the above aspects can be applied to any other aspect, unless these are mutually exclusive. Furthermore, any feature or any parameter described here may be applied to any aspect and/or combined with any other feature or parameter described here, unless these are mutually exclusive.

BRIEF DESCRIPTION OF THE DRAWINGS

Embodiments will now be described by way of example, with reference to the figures, in which.

DETAILED DESCRIPTION

Figure 1:
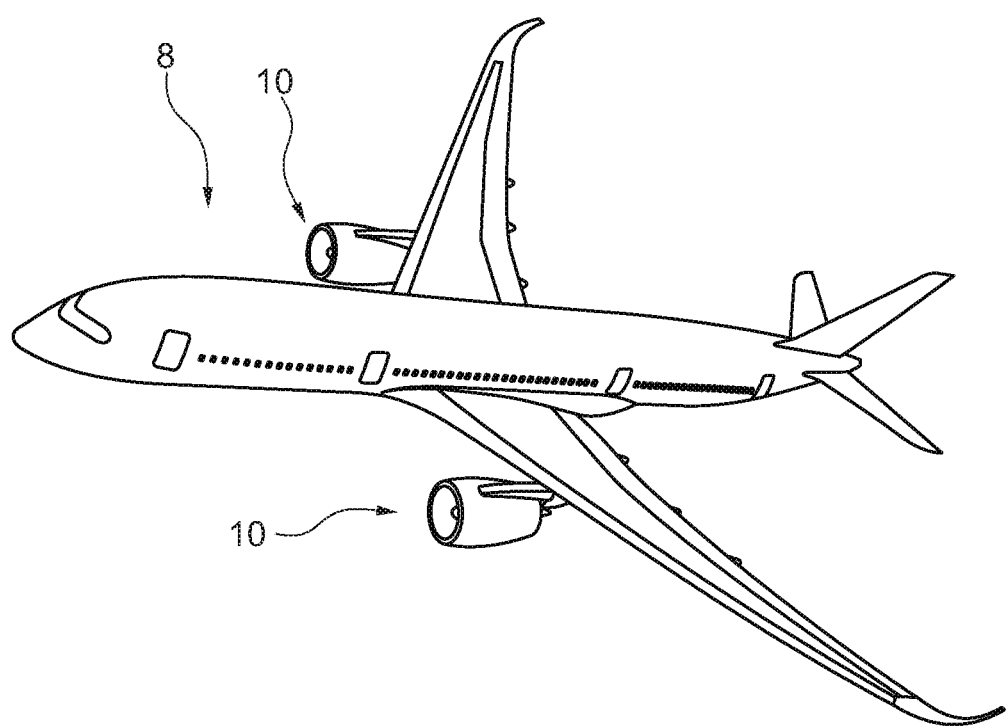
FIG. 1 shows an aircraft in the form of an airplane with several gas turbine engines.

FIG. 1 shows an aircraft 8 in the form of an airplane. The aircraft 8 comprises a plurality of gas turbine engines 10. In order to consume as little fuel as possible and hence allow efficient operation and long ranges, aircraft components are regularly produced in lightweight design. Furthermore, many aircraft components are normally designed so as to achieve service intervals which are as long as possible, and to ensure maximum security against failure.

Figure 2:
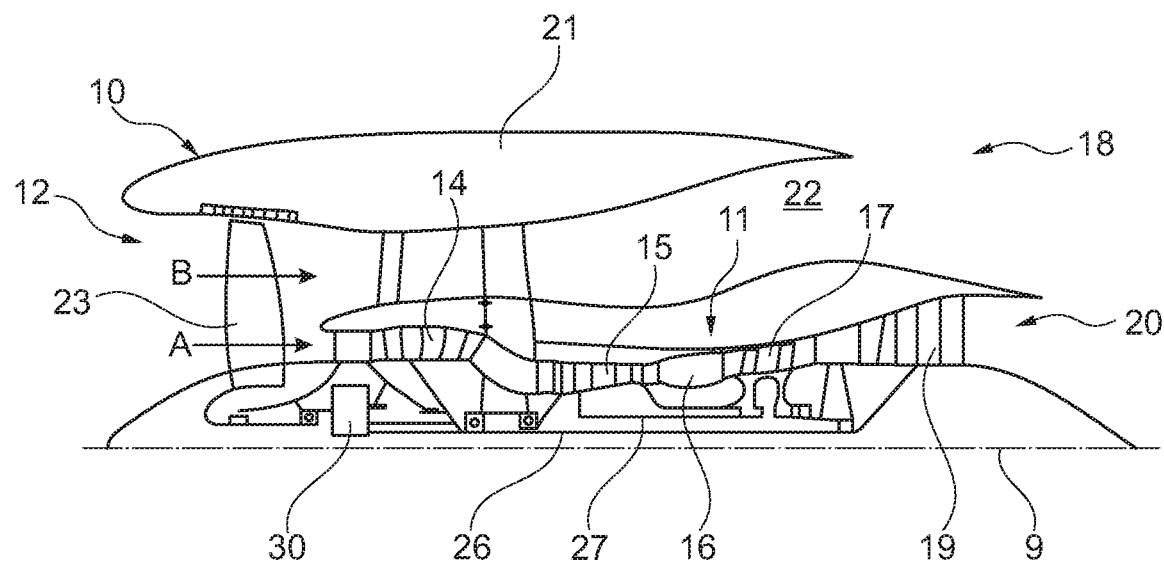
FIG. 2 shows a sectional side view of a gas turbine engine.

FIG. 2 illustrates a gas turbine engine 10 having a principal rotational axis 9. The gas turbine engine 10 comprises an air inlet 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass airflow B flows through the bypass duct 22. The fan 23 is attached to and driven by the low-pressure turbine 19 via a shaft 26 and an epicyclic planetary gear mechanism 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before they are expelled through the nozzle 20 to provide a certain thrust. The high-pressure turbine 17 drives the high-pressure compressor 15 by means of a suitable connection shaft 27. The fan 23 generally provides the major part of the propulsive thrust. The epicyclic planetary gear mechanism 30 is a reduction gear.

Figure 3:
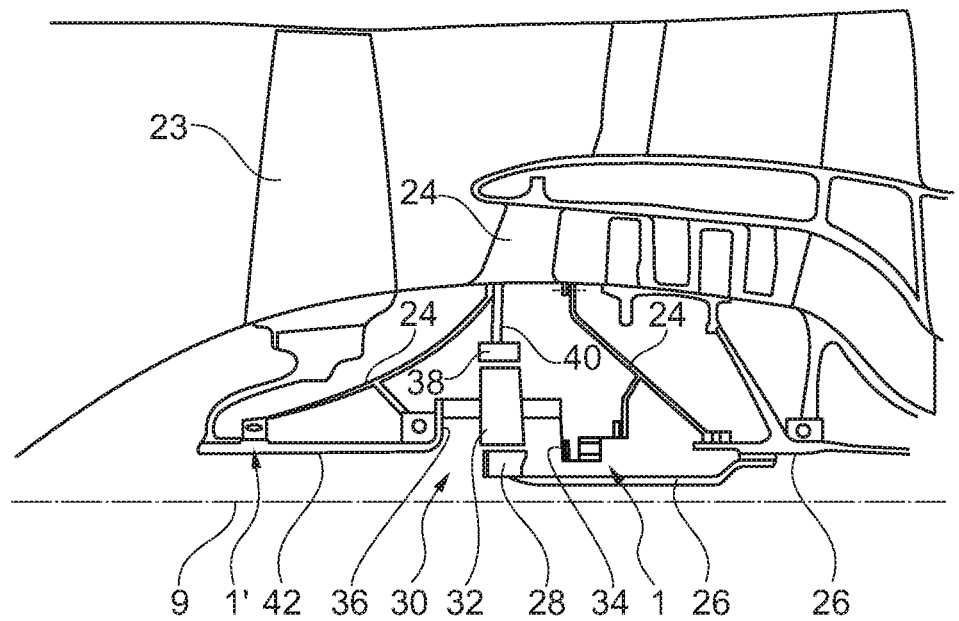
FIG. 3 shows a close-up lateral sectional view of an upstream portion of a gas turbine engine.

An exemplary arrangement for a geared fan gas turbine engine 10 is shown in FIG. 3. The low-pressure turbine 19 (see FIG. 2) drives the shaft 26, which is coupled to a sun wheel 28 of the epicyclic planetary gear mechanism 30. Radially outwardly of the sun wheel 28 and intermeshing therewith is a plurality of planet wheels 32 that are coupled together by a planet carrier 34. The planet carrier 34 guides the planet wheels 32 in such a way that they circulate synchronously around the sun wheel 28, whilst enabling each planet wheel 32 to rotate about its own axis. The planet carrier 34 is coupled via linkages 36 and an output shaft 42 to the fan 23 in order to drive its rotation about the engine axis 9. Radially to the outside of the planet wheels 32 and intermeshing therewith is an external gear or ring gear 38 that is coupled, via linkages 40, to a stationary supporting structure 24.

Note that the terms "low-pressure turbine" and "low-pressure compressor" as used herein may be taken to mean the lowest-pressure turbine stage and lowest-pressure compressor stage (i.e. not including the fan 23) respectively, and/or the turbine and compressor stages that are connected together by the connecting shaft 26 with the lowest rotational speed in the engine (i.e. not including the gearbox output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

Figure 4:
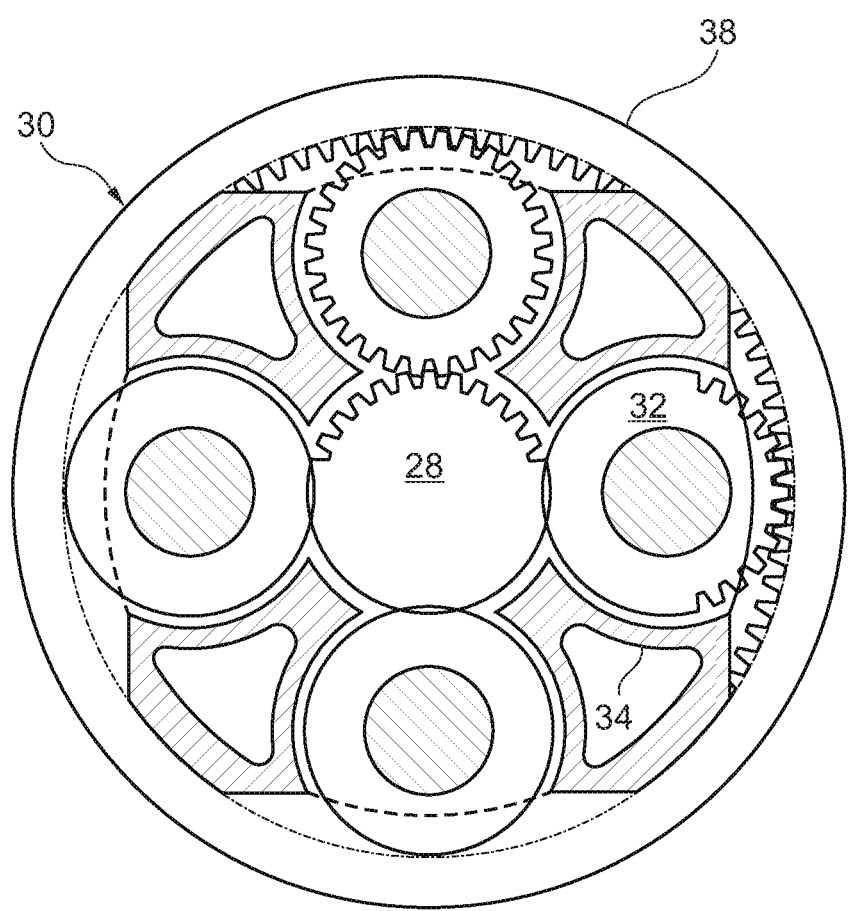
FIG. 4 shows a partially cut-away view of a gear mechanism for a gas turbine engine.

The epicyclic planetary gear mechanism 30 is shown by way of example in greater detail in FIG. 4. The sun wheel 28, planet wheels 32 and ring gear 38 in each case comprise teeth on their periphery to allow intermeshing with the other gearwheels. However, for clarity, only exemplary portions of the teeth are illustrated in FIG. 4. Although four planet wheels 32 are illustrated, it will be apparent to the person skilled in the art that more or fewer planet wheels 32 may be provided within the scope of protection of the claimed invention. Practical applications of an epicyclic planetary gear mechanism 30 generally comprise at least three planet wheels 32.

The epicyclic planetary gear mechanism 30 illustrated by way of example in FIGS. 3 and 4 is a planetary gear mechanism in which the planet carrier 34 is coupled to the output shaft 42 via linkages 36, with the ring gear 38 being fixed. However, any other suitable type of planetary transmission 30 may be used. As a further example, the planetary gear mechanism 30 may be a star arrangement, in which the planet carrier 34 is held fixed, with the ring gear (or external gear) 38 allowed to rotate. In such an arrangement, the fan 23 is driven by the ring gear 38. As a further alternative example, the gear mechanism 30 can be a differential gear mechanism in which both the ring gear 38 and the planet carrier 34 are allowed to rotate.

It will be appreciated that the arrangement shown in FIGS. 3 and 4 is by way of example only, and various alternatives are within the scope of protection of the present disclosure. Purely by way of example, any suitable arrangement may be used for locating the gear mechanism 30 in the gas turbine engine 10 and/or for connecting the gear mechanism 30 to the gas turbine engine 10. As a further example, the connections (for example the linkages 36, 40 in the example of FIG. 3) between the gear mechanism 30 and other parts of the gas turbine engine 10 (such as the input shaft 26, the output shaft and the fixed structure 24) may have a certain degree of stiffness or flexibility. As a further example, any suitable arrangement of the bearings between rotating and stationary parts of the gas turbine engine 10 (for example between the input and output shafts of the gear mechanism and the fixed structures, such as the gear casing) may be used, and the disclosure is not limited to the exemplary arrangement of FIG. 3. For example, where the gear mechanism 30 has a star arrangement (described above), the person skilled in the art would readily understand that the arrangement of output and support linkages and bearing positions would typically be different to that shown by way of example in FIG. 3.

Accordingly, the present disclosure extends to a gas turbine engine having any arrangement of gear mechanism types (for example star or epicyclic-planetary), supporting structures, input and output shaft arrangement, and bearing locations.

Optionally, the gear mechanism may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 2 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Whilst the described example relates to a turbofan engine, the disclosure may be applied, for example, to any type of gas turbine engine, such as an open-rotor (in which the fan stage is not surrounded by a nacelle) or turboprop engine, for example. In some arrangements, the gas turbine engine 10 may not comprise a gear mechanism 30.

The geometry of the gas turbine engine 10, and components thereof, is/are defined by a conventional axis system, comprising an axial direction (which is aligned with the rotation axis 9), a radial direction (in the bottom-to-top direction in FIG. 2), and a circumferential direction (perpendicular to the view in FIG. 2). The axial, radial and circumferential directions run so as to be mutually perpendicular.

The gas turbine engine 10 comprises several roller element devices 1, 1'. A roller element device 1 serves as a roller bearing for the planet carrier 34 on the stationary supporting structure 24. Another roller element device 1' serves as a roller bearing for the output shaft 42 on the stationary supporting structure 24. The roller element devices 1, 1' are explained in more detail below.

Figure 5:
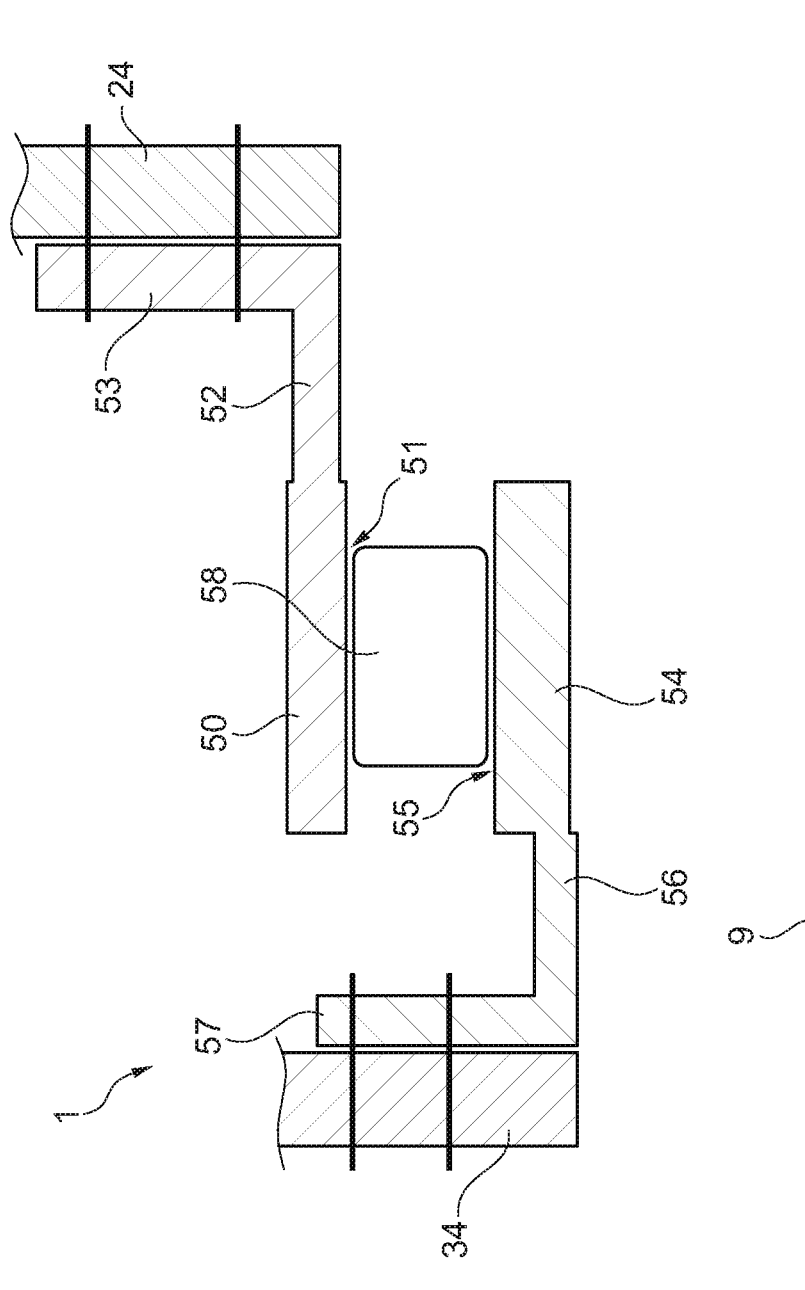
FIG. 5 shows a sectional view of a roller element device.

FIG. 5 shows the roller element device 1 serving as a roller bearing for the planet carrier 34.

The roller element device 1 comprises an outer supporting structure with an outer ring 50, a connecting portion 52 and a fixing portion 53. In the present case, the outer supporting structure is configured as one piece, wherein multipiece designs are also conceivable.

The roller element device 1 furthermore comprises an inner supporting structure with an inner ring 54, a connecting portion 56 and a fixing portion 57. In the example shown, the inner supporting structure is configured as one piece, wherein multipiece designs are also conceivable here too.

The fixing portion 53 of the outer supporting structure is attached to the stationary supporting structure 24 of the gas turbine engine 10, e.g. by means of the bolted joints indicated schematically in FIG. 5, alternatively for example by a weld seam or similar.

The fixing portion 57 of the inner supporting structure is attached to the planet carrier 34 of the gear mechanism 30 of the gas turbine engine 10, e.g. by means of the bolted joints indicated schematically in FIG. 5, alternatively for example by a weld seam or similar.

In the present case, the fixing portions 53, 57 with the respective connecting portion 52, 56 are formed L-shaped in cross-section, but other configurations are also conceivable, e.g. an elongate configuration without angle, or a configuration with several angles. The fixing portions 53, 57 each form a flange. The fixing portions 53, 57 extend in the radial direction starting from the respective connecting portion 52, 56, in the same direction, here towards the outside.

FIG. 5 shows the main rotation axis 9. It is evident that the two connecting portions 52, 56 run parallel to the main rotation axis 9. In concrete terms, the connecting portions 52, 56 are each formed as hollow cylinders. The connecting portions 52, 56 each run coaxially to the main rotation axis 9.

The two fixing portions 53, 57 are spaced apart from each other in the axial direction (parallel to the main rotation axis 9). In the present case, the inner ring 54 is arranged inside the outer ring 50. The outer ring 50 and the inner ring 54 are arranged coaxially to each other. The outer ring 50 has an inner raceway 51 running around the inside. The inner ring 54 has an outer raceway 55 running around the outside. A gap is formed between the raceways 51, 55. Several roller elements 58 are arranged between the raceways 51, 55. In the present case, the roller elements 58 are formed as cylindrical rollers, and can roll on the two running surfaces 51, 55 so that the inner ring 54 and the outer ring 50 are rotatable relative to each other about the main rotation axis 9.

The connecting portion 52 of the outer supporting structure connects the fixing portion 53 of the outer supporting structure to the outer ring 50. The connecting portion 56 of the inner supporting structure connects the fixing portion 57 of the inner supporting structure to the inner ring 54. The raceways 51, 55 are arranged overhanging relative to the respective fixing portion 53, 57. The raceways 51, 55 protrude axially from the respective fixing portion 53, 57. The connecting portions 52, 56 each serve as a connecting arm.

The connecting portions 52, 56 have stiffnesses such that they are flexible and bendable under the loads occurring in operation of the gas turbine engine 10 (in normal operation and/or in extraordinary load cases). In the present case, the stiffnesses of the connecting portions 52, 56 are matched to each other such that the two raceways 51, 55 are jointly tiltable at least in portions or as a whole relative to the rotation axis. If adjacent portions of the raceways 51, 55, e.g. the portions are shown in FIG. 5, are tilted relative to the main rotation axis 9, then the adjacent portions tilt by identical angular amounts. The raceways 51, 55 remain parallel to each other. This may prevent (in particular over a wide radial load range) loads from being supported only or mainly by edges at the axial end faces of the roller elements 58, which can lead to high wear or even to failure of one or more roller elements 58.

Figure 6:
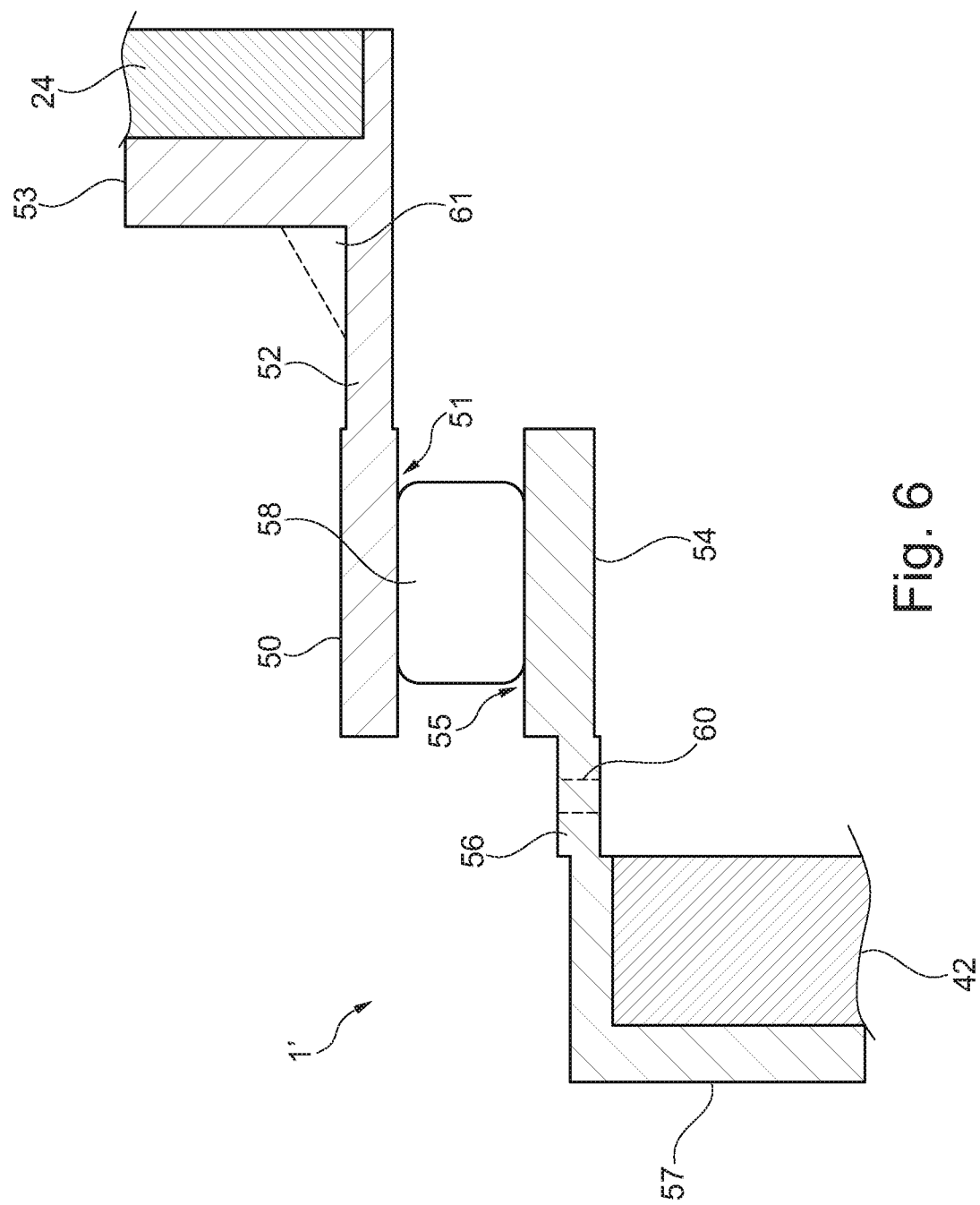
FIG. 6 shows a sectional view of a roller element device in a force-free state.

FIG. 6 shows a roller element device 1' which largely corresponds to the roller element device 1 shown in FIG. 5, so only the differences are explained below.

The fixing portions 53, 57 extend in the radial direction, starting from the respective connecting portion 52, 56, in different directions. In the present case, the fixing portion 53 of the outer supporting structure extends radially outwardly (away from the main rotation axis 9), and the fixing portion 57 of the inner supporting structure extends radially inwardly (towards the main rotation axis 9).

The fixing portion 57 of the inner supporting structure is attached to the output shaft 42 driving the fan 23.

FIG. 6 furthermore shows an optional opening 60 (generally a weakening) of one of the connecting portions, here for example the connecting portion 56 of the inner supporting structure. The opening 60 in the present case is configured as a passage bore. The opening 60 may increase the flexibility of the connecting portion 56, e.g. to adapt this to the flexibility of the other connecting portion 52.

Furthermore, FIG. 6 indicates in dotted lines an optional reinforcement 61, here in the form of the reinforcing rib. The reinforcement 61 may reduce the flexibility of the connecting portion 52, e.g. to adapt this to the flexibility of the other connecting portion 56.

Figure 7:
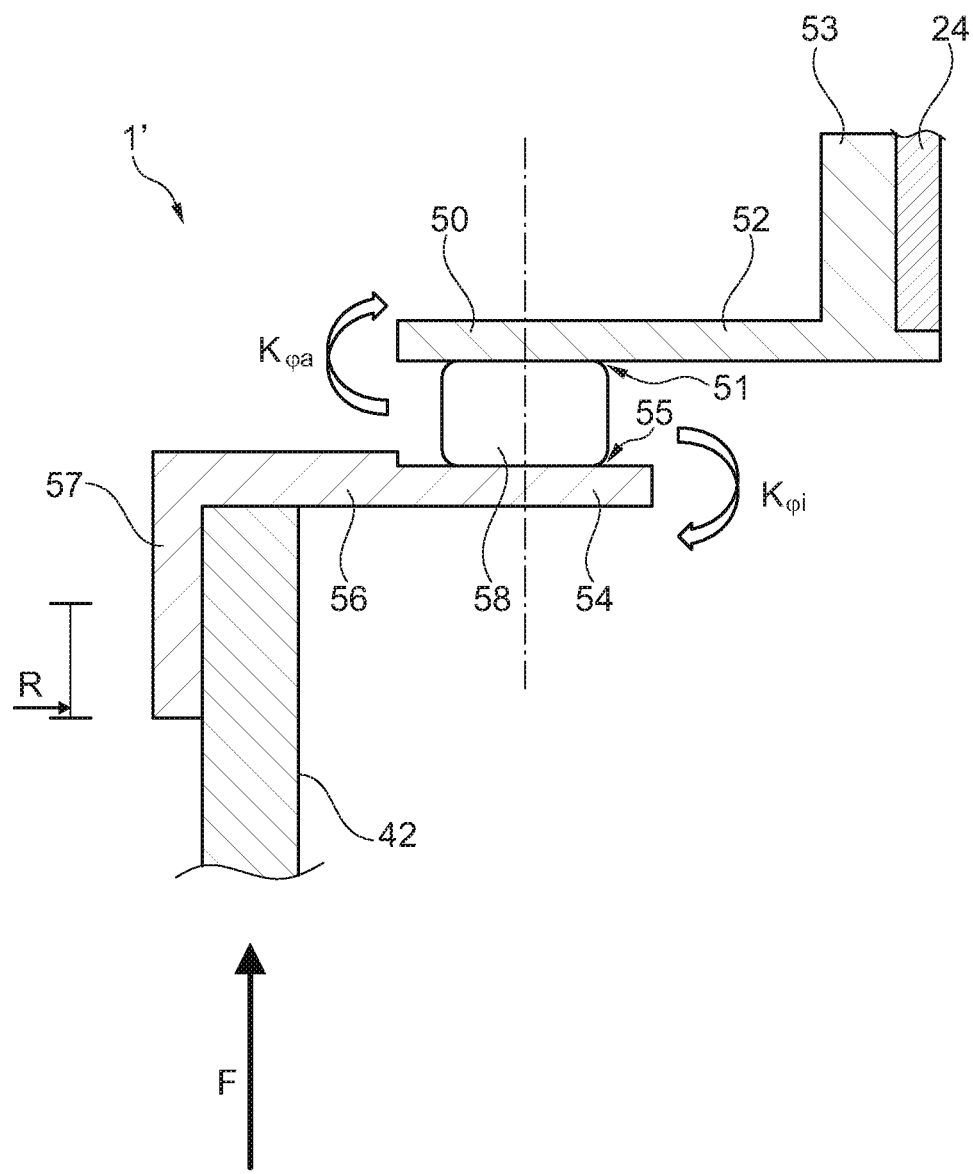
FIG. 7 shows the roller element device from FIG. 6, wherein additional directions of forces are illustrated.

FIG. 7 shows the roller element device 1' from FIG. 6, wherein an additional input force F is depicted. The force F acts radially outwardly on the output shaft 42 and thereby presses the fixing portion 57 of the inner supporting structure towards the outside. FIG. 7 shows a state of the output shaft 42 after not moving or moving towards the outside by only an insignificant radial displacement R.

FIG. 7 furthermore shows arrows indicating the tilt direction in which the inner ring 54 and outer ring 50 tilt under the effect of the force F. Accordingly, the fixing portions 53, 57 move axially closer together.

It is provided that the connecting portions 52, 56 have rotational stiffnesses $K_{\varphi a}$, $K_{\varphi i}$, the ratio of which is 1.0+/−0.2, in particular 1.0+/−0.1, in particular 1.0+/−0.05. In the example shown, the ratio is 1.0. This may ensure that despite the effect of the radial force F, no edge wear occurs. The ratio may also be indicated as follows: $0.9*K_{\varphi i} < K_{\varphi a} < 1.1*K_{\varphi i}$.

The rotational stiffnesses may e.g. be measured in that one end of the respective connecting portion 52, 56 is held stationary while a torque is exerted on the other end, and the deflection determined. This may optionally take place with a cutout piece of the respective connecting portion 52, 56.

Figure 8:
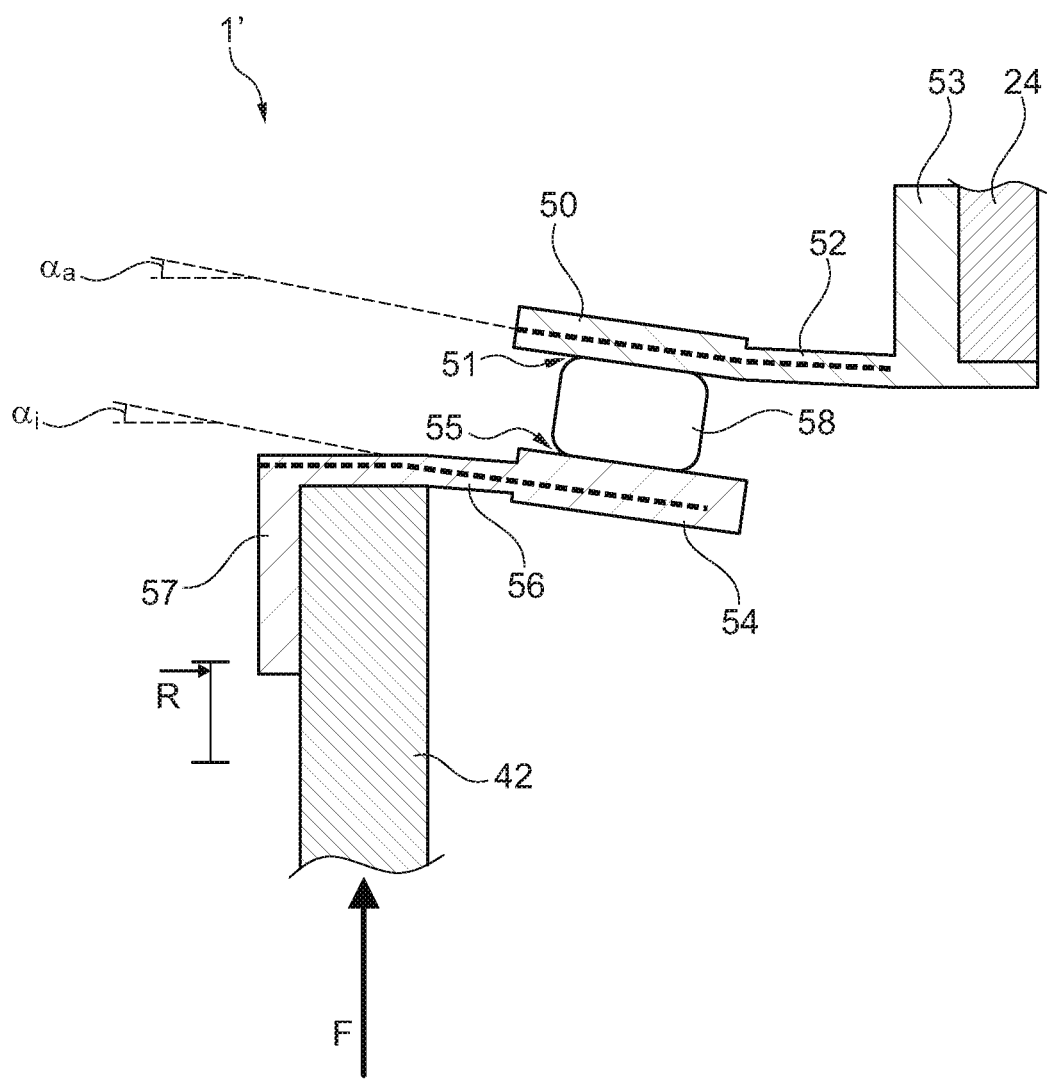
FIG. 8 shows the roller element device from FIGS. 6 and 7 in a state in which the forces illustrated in FIG. 7 are acting on the roller element device.

FIG. 8 shows a state in which the output shaft 42 has moved radially outwardly by a radial displacement R under the effect of the force F. The connecting portions 52, 56 have permitted this movement and have thereby been deformed elastically. By matching the stiffnesses of the connecting portions 52, 56 to each other, the inner ring 54 and the outer ring 50 and hence the two raceways 51, 55 are tilted jointly and parallel to each other.

The angles $\alpha_a$, $\alpha_i$, by which the inner ring 54 and the outer ring 50 have been tilted are illustrated by the dotted secondary lines. The angles $\alpha_a$, $\alpha_i$ here fulfil the following equation: $|\alpha_a - \alpha_i| \leq 1.5$ mrad.

Thus parallel tilting occurs over a defined, in particular a predefined load range.

Thus the output shaft 42 is movable radially and/or axially relative to the stationary supporting structure 24 under the forces occurring (in general, this applies to two components rotatably connected together by means of the roller element device 1; 1'). It is thereby possible to accommodate loads during the operation of the gas turbine engine 10, e.g. those due to load changes or thermal expansion or contraction of individual components.

Thus a roller bearing is provided which can operate under conditions which would normally lead to bearing damage.

Figure 9:
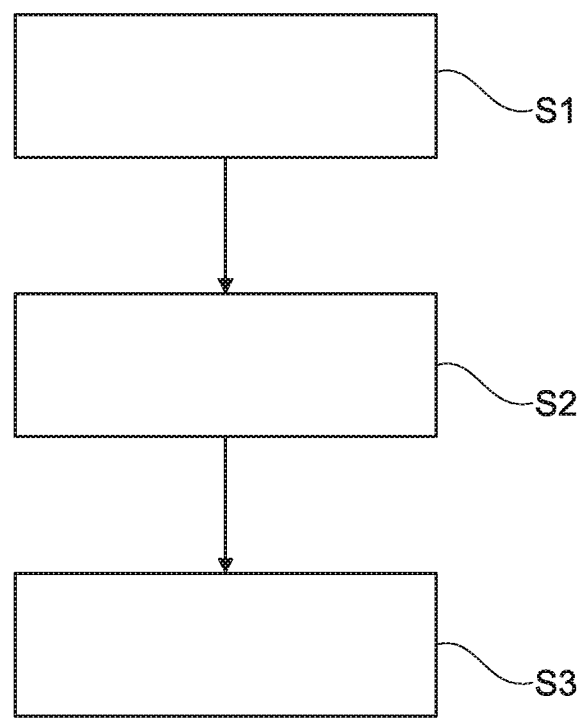
FIG. 9 shows a method for producing a roller element device.

FIG. 9 shows a method for producing a roller element device 1; 1', in particular as described above.

In a first step S1, a geometry (in particular a material thickness) and/or material properties (in particular the material choice, e.g. steel) of connecting portions 52, 56 for a roller element device 1; 1' are determined, in particular in an optimization procedure. For this purpose, one or more of the parameters mentioned is varied with the aim of achieving rotational stiffnesses which are as far as possible the same for the connecting portions 52, 56. Here again, a predefined bearing stiffness may be specified as a target value.

As an option, the optimization procedure comprises an FEM algorithm and/or is performed iteratively.

In a second step S2, an outer ring 50 with an inner raceway 51, and an inner ring 54 with an outer raceway 55 are provided, wherein the outer ring 50 and the inner ring 54 are each connected via a connecting portion 52, 56 to a respective fixing portion 53, 57 for fixed connection to one of two components 24, 34; 24, 42 which are rotatable relative to each other about a rotation axis 9, and wherein the connecting portions 52, 56 are matched to each other (in particular according to the optimization procedure) such that the two raceways 51, 55 can be jointly tilted at least in portions relative to the rotation axis 9.

In a third step S3, roller elements 58 are arranged between the raceways 51, 55 such that the roller elements 58 can roll on the two raceways 51, 55 simultaneously.

Thus a roller element bearing is provided, in particular for a geared turbofan engine, which has balanced bending moments.

It will be understood that the invention is not limited to the embodiments above-described and various modifications and improvements can be made without departing from the concepts described herein. Any of the features may be used separately or in combination with any other features, unless they are mutually exclusive, and the disclosure extends to and includes all combinations and subcombinations of one or more features which are described here. In particular, it is pointed out that the roller element device 1, 1' can in particular be used at any bearing positions in which at least one of the two raceways cannot be supported directly radially outwardly.

LIST OF REFERENCE SIGNS 1, 1' Roller element device
8 Aircraft
9 Main rotation axis
10 Gas turbine engine
11 Core engine
12 Air intake
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft
27 Connecting shaft
28 Sun wheel
30 Gear mechanism
32 Planet wheel
34 Planet carrier
36 Linkage
38 Ring gear
40 Linkage
42 Output shaft
50 Outer ring
51 Inner raceway
52 Connecting portion
53 Fixing portion
54 Inner ring
55 Outer raceway
56 Connecting portion
57 Fixing portion
58 Roller element
60 Opening
61 Reinforcement
A Core airflow
B Bypass airflow F Force
R Radial displacement
$\alpha_a$, $\alpha_i$ Angle

The invention claimed is:

1. A gas turbine engine for an aircraft, comprising:
a core engine comprising a turbine, a compressor, and a core shaft connecting the turbine to the compressor;
a fan which is positioned upstream of the core engine, wherein the fan comprises a plurality of fan blades; and
a gear mechanism which is drivable by the core shaft,
wherein the fan is drivable by the gear mechanism at a lower speed than the core shaft,
wherein the gear mechanism comprises:
a roller element device, comprising:
an outer ring with an inner raceway,
an inner ring with an outer raceway, and
roller elements arranged between the inner and outer raceways so as to roll on the inner and outer raceways,
wherein the outer ring and the inner ring are each connected via a connecting portion to a respective fixing portion for fixing to one of two components that are rotatable relative to each other about a rotation axis, and
wherein the connecting portions are formed such that inner and outer raceways are jointly tiltable, at least in portions relative to the rotation axis;
wherein the connecting portions each have a stiffness, and the stiffnesses are matched to each other;
wherein the stiffnesses have a ratio relative to each other of 1.0+/−0.2.

2. The gas turbine engine according to claim 1, wherein the two components that are rotatable relative to each other about the rotation axis are a stationary supporting structure and a component of the gas turbine engine which is rotatable relative thereto via the turbine, and the roller element device is configured for rotatable mounting of the rotatable component on the stationary supporting structure.

3. The gas turbine engine according to claim 1, wherein the connecting portions are flexible.

4. The gas turbine engine according to claim 1, wherein the connecting portions are deformed under effect of a force such that the two raceways at least in portions are tilted by a same angle relative to the rotation axis.

5. The gas turbine engine according to claim 1, wherein the inner and outer raceways are oriented parallel to each other both in a state tilted relative to the rotation axis and in a non-tilted state.

6. The gas turbine engine according to claim 1, wherein the inner and outer raceways are arranged overhanging relative to the respective fixing portions.

7. The gas turbine engine according to claim 1, wherein the outer ring and the inner ring are axially spaced from the respective fixing portions by the respective connecting portions.

8. The gas turbine engine according to claim 1, wherein the roller element device is a roller bearing.

9. The gas turbine engine according to claim 1, wherein the roller element device is a cylindrical roller bearing.

10. The gas turbine engine according to claim 1, wherein the gear mechanism is a planetary gear mechanism with a gear element mounted rotatably by the roller element device.

11. The gas turbine engine according to claim 1, wherein:
the turbine is a first turbine, the compressor is a first compressor, and the core shaft is a first core shaft;
the core engine further comprises a second turbine, a second compressor, and a second core shaft which connects the second turbine to the second compressor; and
the second turbine, second compressor, and second core shaft are arranged to rotate at a higher speed than the first core shaft.

12. The gas turbine engine according to claim 1, wherein the stiffnesses have a ratio relative to each other of 1.0+/−0.1.

13. The gas turbine engine according to claim 1, wherein the stiffnesses have a ratio relative to each other of 1.0+/−0.05.

* * * * *